(12) United States Patent
Kitahara et al.

(10) Patent No.: US 8,848,292 B2
(45) Date of Patent: Sep. 30, 2014

(54) OPTICAL FILTER AND METHOD FOR MANUFACTURING OPTICAL FILTER

(75) Inventors: Koji Kitahara, Ina (JP); Tomoki Sakashita, Chino (JP)

(73) Assignee: Seiko Epson Corporation (JP)

( * ) Notice: Subject to any disclaimer, the term of this patent is extended or adjusted under 35 U.S.C. 154(b) by 312 days.

(21) Appl. No.: 13/281,006

(22) Filed: Oct. 25, 2011

(65) Prior Publication Data

US 2012/0120495 A1 May 17, 2012

(30) Foreign Application Priority Data

Nov. 15, 2010 (JP) ................................. 2010-254592

(51) Int. Cl.
*G02B 26/00* (2006.01)

(52) U.S. Cl.
CPC ................... *G02B 26/001* (2013.01)
USPC ........................................................ 359/578

(58) Field of Classification Search
CPC .. G02B 26/00–26/008; G02B 6/293–6/29398; G01J 3/20–3/2289
USPC ..................... 359/359–360, 370–371, 489.19, 359/577–590, 722–723, 890, 892; 356/450–521
See application file for complete search history.

(56) References Cited

U.S. PATENT DOCUMENTS

| | | | | |
|---|---|---|---|---|
| 6,954,294 B2 * | 10/2005 | Sato | ............................... | 359/588 |
| 7,015,457 B2 * | 3/2006 | Cole et al. | ...................... | 250/226 |
| 2004/0027671 A1 * | 2/2004 | Wu et al. | ........................ | 359/578 |
| 2005/0111008 A1 * | 5/2005 | Murata | ............................ | 356/519 |
| 2005/0122191 A1 * | 6/2005 | Nakamura et al. | ............. | 333/202 |
| 2007/0171530 A1 * | 7/2007 | Nakamura | ..................... | 359/580 |
| 2009/0317617 A1 | 12/2009 | Sato et al. | | |
| 2010/0103522 A1 * | 4/2010 | Matsumoto | .................... | 359/578 |

FOREIGN PATENT DOCUMENTS

| | | |
|---|---|---|
| JP | 2008-116669 | 5/2008 |
| JP | 2009-131911 | 6/2009 |
| JP | 2009-134025 | 6/2009 |
| JP | 2009-134027 | 6/2009 |
| JP | 2009-134028 | 6/2009 |
| JP | 2009-139601 | 6/2009 |
| JP | 2009-142047 | 6/2009 |
| JP | 2009-251105 A | 10/2009 |
| JP | 2010-003853 A | 1/2010 |

* cited by examiner

*Primary Examiner* — Stephone B Allen
*Assistant Examiner* — Jeffrey Madonna
(74) *Attorney, Agent, or Firm* — Harness, Dickey & Pierce, P.L.C.

(57) ABSTRACT

An optical filter comprising a first substrate, a second substrate having a support portion which supports the first substrate, a first optical film provided on the first substrate, a second optical film provided on the second substrate and arranged to face the first optical film, a first protective film covering at least the first optical film, a second protective film covering at least the second optical film, a first bonding film, a portion of the first bonding film overlapping a surface of the first protective film in a plan view but does not overlapping the first optical film and a second bonding film, a portion of the second bonding film overlapping a surface of the second protective film in the plan view but does not overlapping the second optical film.

9 Claims, 7 Drawing Sheets

FIG. 6G <FIRST SUBSTRATE>

FIG. 6G <SECOND SUBSTRATE>

OPTICAL FILTER AND METHOD FOR MANUFACTURING OPTICAL FILTER

BACKGROUND

1. Technical Field

The present invention relates to an optical filter and a method for manufacturing an optical filter.

2. Related Art

JP-A-2009-134028 (Patent Document 1) discloses an optical filter composed of a Fabry-Perot etalon filter (hereinafter referred to as etalon filter or simply referred to as etalon in some cases) having a pair of optical films which face each other via a predetermined gap.

The etalon filter disclosed in Patent Document 1 includes a first substrate and a second substrate which are held in parallel to each other, a first optical film (first reflection layer) formed on the first substrate, and a second optical film (second reflection layer) facing the first optical film with a predetermined gap and formed on the first substrate. Each of the first optical film and the second optical film constitutes a mirror. By causing multiple interference of light between the mirrors, only light in a predetermined wavelength range according to the length of the gap (gap amount) can be transmitted. Moreover, by variably controlling the gap amount, the wavelength range of light to be transmitted can be changed.

In the etalon filter disclosed in Patent Document 1, bonding films each containing a siloxane (Si—O) bond are used for the bonding of the first substrate to the second substrate. The accuracy of wavelength separation in the etalon filter is deeply associated with the accuracy of gap amount. Accordingly, for improving the performance of the etalon filter, the length of the gap between the first optical film and the second optical film needs to be controlled with a high degree of accuracy. As one factor of the accuracy, when the first substrate and the second substrate are bonded via the bonding films each containing the siloxane bond, it is important to assure parallelism between the substrates without inclining the substrates.

However, in Patent Document 1, for bonding the substrates using the bonding films, processes are needed such that for example, the bonding film formed on each of the substrates is activated by ultraviolet irradiation, oxygen plasma treatment, or the like, alignment of the substrates is performed, and a load is applied to each of the substrates. In these steps, a slight inclination of the substrate may occur.

As causes of the occurrence of inclination of the substrate, the following is considered as one of the causes: an inclination, a rounded portion, or the like is likely to be formed at an edge portion of the bonding film, and due to misalignment (bonding film misalignment) when the bonding film is partially formed on each of the substrates or due to substrate misalignment in a step of bonding the substrates together, the inclination or rounded portion of the edge portion of the bonding film induces non-uniform deformation of the bonding film by the load in bonding.

SUMMARY

An advantage of some aspects of the invention is to provide an optical filter in which even when misalignment occurs, the occurrence of inclination of a substrate due to a bonding film is suppressed to make a gap between optical films facing each other uniform.

Application Example 1

This application example of the invention is directed to an optical filter including: a first substrate; a second substrate having a support portion which supports the first substrate; a first optical film provided on the first substrate; a second optical film provided on the second substrate and arranged to face the first optical film; a first protective film covering at least the first optical film; a second protective film covering at least the second optical film; a first bonding film a portion of which overlaps a surface of the first protective film in plan view but does not overlap the first optical film; and a second bonding film a portion of which overlaps a surface of the second protective film in plan view but does not overlap the second optical film.

According to this application example, by covering the optical film with the protective film, a surface of the optical film is protected against a reaction with components in the atmosphere, making it possible to prevent deterioration of characteristics of the optical film. Moreover, in a step of removing a portion of the bonding film covering an optical film forming region after widely depositing the bonding film on the substrate face, since the protective film is formed on the surface of the optical film, the occurrence of damage to the surface of the optical film in the removing step can be easily prevented. Further, a forming region of the bonding film is formed in a wide range beyond a bonding portion region, whereby the gap between the optical films produced by an inclination of the substrate in boding of the substrates can be held uniform with a high degree of accuracy, making it possible to obtain an optical filter excellent in spectral characteristics.

Application Example 2

This application example is directed to the optical filter of the above application example, wherein each of the first bonding film and the second bonding film is a plasma-polymerized film containing a Si skeleton having a siloxane bond and a leaving group bonded to the Si skeleton. According to this application example, excellent mechanical characteristic of bonding can be obtained, and application of activation energy as activation treatment before bonding can change a hydrophobic coating into a hydrophilic coating. Therefore, handling easiness before bonding and a high bonding force after bonding can be obtained.

Application Example 3

This application example is directed to the optical filter of the above application example, wherein each of the first protective film and the second protective film is aluminum oxide ($Al_2O_3$) or aluminum nitride (AlN).

According to this application example, by forming a protective film having high gas barrier resistance, the surface of the optical film is reliably protected against a reaction with components in the atmosphere, making it possible to obtain an optical film which is free from deterioration of characteristics. Further, also in removing of the bonding film in the optical film forming region, damage to the optical film due to the removing step can be reliably prevented.

Application Example 4

This application example is directed to a method for manufacturing an optical filter including a first substrate, a second substrate having a support portion which supports the first substrate, a first optical film provided on the first substrate, a second optical film provided on the second substrate and arranged to face the first optical film, a first bonding film disposed on a supported region face of the first substrate, the supported region face being arranged to face the support face of the second substrate, a second bonding film disposed on a support face of the support portion, the support face supporting the first substrate, wherein the first substrate and the second substrate are fixed to each other by bonding the first bonding film to the second bonding film at the support face and the supported region face, the method including: forming a first protective film covering at least a surface of the first optical film; forming a second protective film covering at least a surface of the second optical film; forming the first bonding film on a forming side of the first optical film of the first substrate so as to include at least the support face; forming the second bonding film on a forming side of the second optical film of the second substrate so as to include at least the supported region face; removing a portion of the first bonding film, the portion overlapping the first optical film in plan view; and removing a portion of the second bonding film, the portion overlapping the second optical film in plan view.

According to this application example, by covering the optical film with the protective film, a surface of the optical film is protected against a reaction with components in the atmosphere, making it possible to obtain an optical filter in which deterioration of characteristics of the optical film can be prevented. Moreover, in the step of removing the portion of the bonding film covering an optical film forming region after widely depositing the bonding film on the substrate face, since the protective film is formed on the surface of the optical film, the occurrence of damage to the surface of the optical film in the bonding film removing step can be easily prevented. Further, a forming region of the bonding film is formed in a wide range beyond a bonding portion region, whereby the gap between the optical films produced by an inclination of the substrate in boding of the substrates can be held uniform with a high degree of accuracy, making it possible to obtain an optical filter excellent in spectral characteristics.

Application Example 5

This application example is directed to the method for manufacturing an optical filter of the above application example, wherein each of the first and second protective films is aluminum oxide ($Al_2O_3$) or aluminum nitride (AlN). According to this application example, by forming a protective film having high gas barrier resistance, the surface of the optical film is reliably protected against a reaction with components in the atmosphere, making it possible to obtain an optical filter including an optical film which is free from deterioration of characteristics. Further, damage to the optical film in the bonding film removing step in the optical film forming region can be reliably prevented.

Application Example 6

This application example is directed to the method for manufacturing an optical filter of the above application example, the removing of the first bonding film and the second bonding film is performed by a dry etching method. According to this application example, the bonding film formed in the optical film forming region can be reliably removed, making it possible to obtain an optical filter including an optical film excellent in spectral characteristics.

BRIEF DESCRIPTION OF THE DRAWINGS

The invention will be described with reference to the accompanying drawings, wherein like numbers reference like elements.

FIGS. 1A to 1C show an optical filter according to a first embodiment, in which FIG. 1A is an external plan view, FIG. 1B is a cross-sectional view of portion A-A' shown in FIG. 1A, and FIG. 1C is an enlarged cross-sectional view of portion L shown in FIG. 1B.

DESCRIPTION OF EXEMPLARY EMBODIMENTS

Hereinafter, embodiments according to the invention will be described with reference to the drawings.

First Embodiment

Figure 1A:
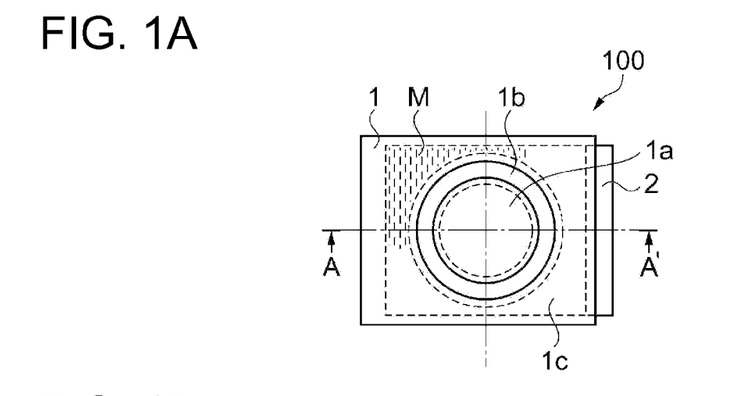
Figure 1B:
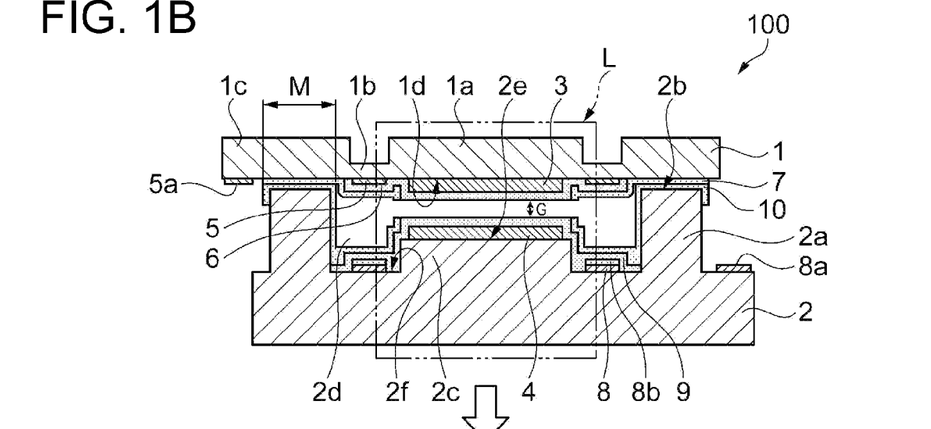
Figure 1C:
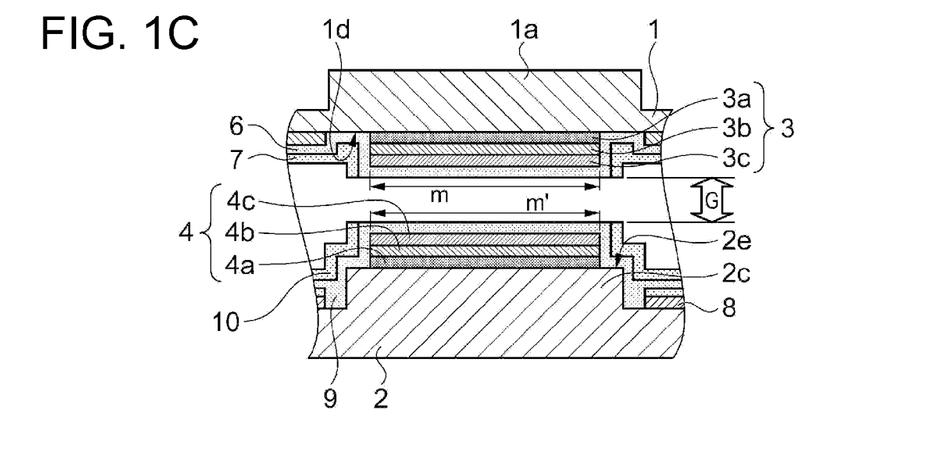

FIGS. 1A to 1C show a variable-gap etalon filter whose gap between optical films can be variably controlled, as one example of an optical filter according to a first embodiment. FIG. 1A is an external plan view, FIG. 1B is a cross-sectional view of portion A-A' shown in FIG. 1A, and FIG. 1C is an enlarged view of portion L shown in FIG. 1B. As shown in FIG. 1B, the variable-gap etalon filter 100 (hereinafter referred to as etalon filter 100) has a configuration in which a first substrate 1 and a second substrate 2 are supported by a support face 2b of a support portion 2a of the second substrate 2 and fixed together.

As shown in FIGS. 1A and 1B, the first substrate 1 according to the embodiment is formed of a silica glass substrate having a thickness of about 200 μm. The first substrate 1 includes a diaphragm portion 1b formed to have a thin thickness substantially at the center of the first substrate 1 and a movable portion 1a connected to the inside of the diaphragm portion 1b and continuous from the diaphragm portion 1b. Further, the first substrate 1 includes a holding portion 1c connected to the outside of the diaphragm portion 1b and holding the movable portion 1a via the diaphragm portion 1b. The holding portion 1c, the movable portion 1a, and the diaphragm portion 1b constitute the first substrate 1. A surface of the first substrate 1 is polished to mirror surface.

On a mirror forming face 1d of the first substrate 1 facing the second substrate 2, a first optical film 3 having both reflection characteristics and transmission characteristics for light in a desired wavelength band is formed. As shown in FIG. 1C, the first optical film 3 is a film composed of a first optical substrate film. 3a, a first optical intermediate film 3b, and a first optical surface film 3c which are stacked in order from the side of the first substrate 1. The first optical substrate film 3a is formed on the first substrate 1 by depositing titanium oxide ($TiO_2$) or tantalum oxide ($Ta_2O_5$) having a refractive index higher than that of silica glass of which the first substrate 1 is formed, to a thickness of about 30 nm. On a surface of the first optical substrate film 3a opposite to the mirror forming face 1d, the first optical intermediate film 3b is formed.

As the first optical intermediate film 3b, a low refractive index material having a refractive index lower than that of the first optical substrate film 3a, for example, a $SiO_2$ film is preferably used. The first optical intermediate film 3b is formed to a thickness of 20 to 30 nm. Further, on a side of the first optical intermediate film 3b opposite to the first optical substrate film 3a, the first optical surface film 3c is formed. The first optical surface film 3c is formed of a metal film of a simple substance of silver or a silver alloy such as Ag, AgC, AgCu, or AgSmCu for example, or a simple substance of Al to a thickness of 30 to 40 nm. In this manner, the first optical substrate film 3a, the first optical intermediate film 3b, and the first optical surface film 3c are stacked to constitute the first optical film. 3 having both reflection characteristics and transmission characteristics for light in a desired wavelength band.

Moreover, a first actuator electrode 5 is formed in a region of the diaphragm portion 1b on the mirror forming face 1d of the first substrate 1 and connected to a first external connection electrode 5a through not-shown internal wiring. Further, on the side of the mirror forming face 1d of the first substrate 1 in an inside region of a bonding region M of the first substrate 1 and the second substrate 2 shown in FIG. 1B, the inside region not including the bonding region M, a first protective film 6 is formed so as to cover the first optical film 3 and a surface of the first actuator electrode 5 excluding the first external connection electrode 5a. The first protective film 6 is formed for protecting a surface of the first optical film 3, that is, a surface of the first optical surface film 3c against a reaction with components in the atmosphere to avoid deterioration of characteristics of the first optical film 3. For example, $Al_2O_3$, AlN, or the like is preferably used for the first protective film 6. Moreover, by covering the first actuator electrode 5 with the first protective film 6, insulation and electrode protection can be established.

On a surface of the first protective film 6, a first bonding film 7 is formed. A forming region of the first bonding film 7 includes at least the bonding region M shown in FIGS. 1A and 1B. In a region of the first substrate including the bonding region M but excluding a forming region m of the first optical film 3 and the first external connection electrode 5a, the first bonding film 7 is formed. For the first bonding film 7, for example, a film containing a Si skeleton having a siloxane bond and a leaving group bonded to the Si skeleton can be used, and the bonding of the first bonding film 7 to a second bonding film 10 formed on the second substrate 2, which will be described later, can be strengthened.

Next, the second substrate 2 will be described. The second substrate 2 is formed of a silica glass base material having a thickness of about 200 µm similarly to the first substrate 1. The second substrate 2 includes, on a side thereof arranged to face the first substrate 1, a mirror forming portion 2c having a mirror forming face 2e on which a second optical film 4 facing the first optical film 3 and described later is formed, the support portion 2a supporting the first substrate 1, and a recess 2d between the support portion 2a and the mirror forming portion 2c. A surface of the second substrate 2 is polished to mirror surface. On the bottom of the recess 2d, a second actuator electrode 8 arranged to face the first actuator electrode 5 is arranged.

As shown in FIG. 1C, the second optical film 4 formed on the mirror forming portion 2c of the second substrate 2 has a configuration similar to that of the first optical film 3 described above. That is, the second optical film 4 has both reflection characteristics and transmission characteristics for light in a desired wavelength band and is a film composed of a second optical substrate film 4a, a second optical intermediate film 4b, and a second optical surface film 4c which are stacked in order from the side of the second substrate 2. The second optical substrate film 4a is formed on the second substrate 2 by depositing titanium oxide ($TiO_2$) or tantalum oxide ($Ta_2O_5$) having a refractive index higher than that of silica glass of which the second substrate 2 is formed, to a thickness of about 30 nm. On a surface of the second optical substrate film 4a opposite to the mirror forming face 2e, the second optical intermediate film 4b is formed.

As the second optical intermediate film 4b, a low refractive index material having a refractive index lower than that of the second optical substrate film 4a, for example, a $SiO_2$ film is preferably used. The second optical intermediate film 4b is formed to a thickness of 20 to 30 nm. Further, on a side of the second optical intermediate film 4b opposite to the second optical substrate film 4a, the second optical surface film 4c is formed. The second optical surface film 4c is formed of a metal film of a simple substance of silver or a silver alloy, such as Ag, AgC, AgCu, or AgSmCu for example, or a simple substance of Al, to a thickness of 30 to 40 nm. In this manner, the second optical substrate film 4a, the second optical intermediate film 4b, and the second optical surface film 4c are stacked to constitute the second optical film 4 having both reflection characteristics and transmission characteristics for light in a desired wavelength band.

The second actuator electrode 8 formed on a bottom face 2f of the recess 2d of the second substrate 2 is connected to a second external connection electrode 8a through not-shown internal wiring. Moreover, on a surface of the second actuator electrode 8, an electrode protective film 8b is formed. The electrode protective film 8b is formed by depositing, for example, a TEOS film to a thickness of about 0.1 µm the surface of the second actuator electrode 8 excluding the second external connection electrode 8a. The first actuator electrode 5 and the second actuator electrode 8 are connected to a not-shown actuator driving circuit via the first external connection electrode 5a and the second external connection electrode 8a.

Further, on the second substrate 2 in the inside region of the bonding region M shown in FIG. 1B, the inside region not including the bonding region M, a second protective film 9 is formed so as to cover the second optical film 4 and the surface of the second actuator electrode 8 excluding the second external connection electrode 8a. Similarly to the first protective film 6 on the first substrate 1, the second protective film 9 is formed for protecting a surface of the second optical film 4, that is, a surface of the second optical surface film 4c against a reaction with components in the atmosphere to avoid deterioration of characteristics of the second optical film 4. For example, $Al_2O_3$, AlN, or the like is preferably used for the second protective film 9. Moreover, by covering the second actuator electrode 8 with the second protective film 9, insulation and electrode protection can be established together with the electrode protective film 8b. On a surface of the second protective film 9, the second bonding film. 10 is formed. A forming region of the second bonding film 10 includes at least the bonding region M shown in FIGS. 1A and 1B. In a region of the second substrate including the bonding region M but excluding a forming region m' of the second optical film 4 and the second external connection electrode 8a, the second bonding film 10 is formed. For the second bonding film 10, for example, a film containing a Si skeleton having a siloxane bond and a leaving group bonded to the Si skeleton can be used similarly to the first bonding film 7, and the bonding of the second bonding film 10 to the first bonding film 7 formed on the first substrate 1 can be strengthened.

The first bonding film 7 and the second bonding film 10 formed as described above on the first substrate 1 and the second substrate 2, respectively, are activated by ultraviolet irradiation, oxygen plasma treatment, or the like. Next, the first substrate 1 and the second substrate 2 are arranged so that the first bonding film 7 and the second bonding film 10 face each other; alignment in plan view is performed to place the first substrate 1 on the support face 2*b* of the support portion 2*a* of the second substrate 2; and a load is applied to each of the substrates to bond them together while maintaining a predetermined gap for a gap G between the first optical film 3 and the second optical film 4. Therefore, the etalon filter 100 is formed.

In the etalon filter 100 according to the embodiment, for maintaining optical characteristics of the first optical film 3 and the second optical film 4, the first bonding film 7 and the second bonding film 10 should not be left within at least the forming region m of the first optical film 3 and the forming region m' of the second optical film 4. Therefore, the first bonding film 7 and the second bonding film 10 are deposited on the entire surfaces on bonding film deposition sides of the first substrate 1 and the second substrate 2, respectively; a resist material is patterned so that peeled regions including the regions m and m' serve as openings; and the bonding films in the peeled regions including the regions m and m' are peeled off by a predetermined peeling method, which will be described in detail in a later-described manufacturing method.

Figure 2A:
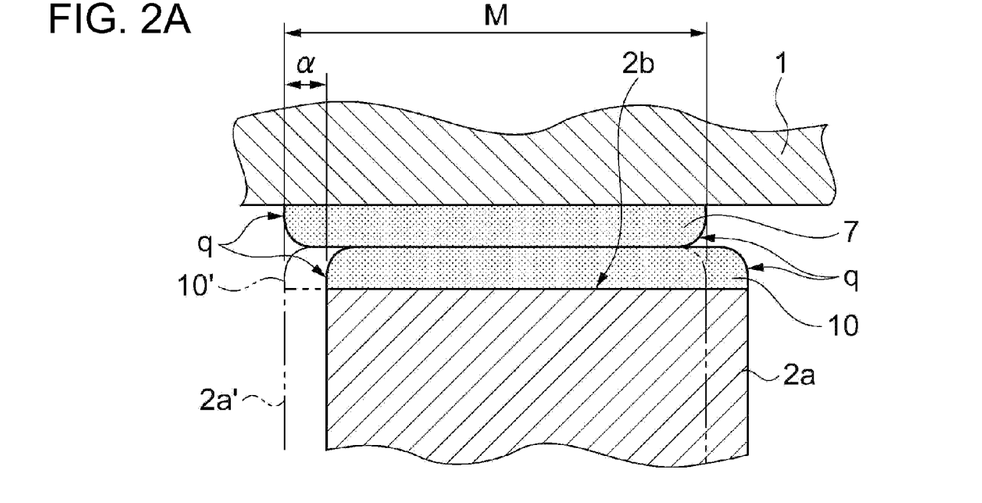
FIGS. 2A and 2B are enlarged schematic cross-sectional views each showing a substrate bonding portion in the optical filter.
Figure 2B:
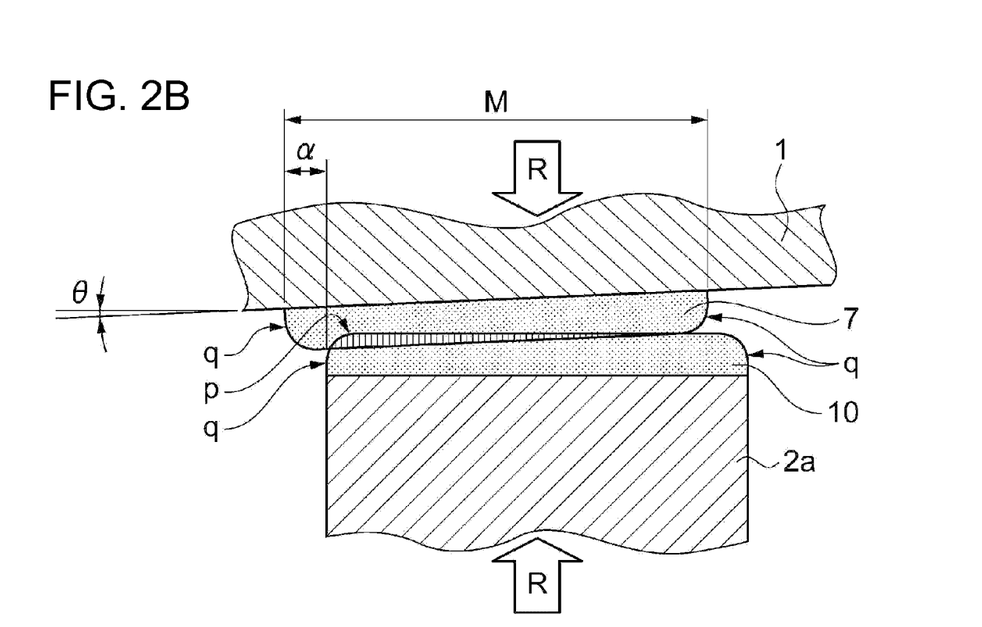

It is desirable that in the bonding region M as a bonding portion, the first bonding film 7 and the second bonding film 10 are deposited in a range beyond the region M. FIGS. 2A and 2B are enlarged views of the portion of the bonding region M when bonding films are formed only in the bonding region M. As shown in FIG. 2A, when the first substrate 1 and the support portion 2*a* of the second substrate 2 are arranged to face each other, the state where the first bonding film 7 is formed in the bonding region M of the first substrate 1 and the second bonding film 10 is formed on the support face 2*b* of the support portion 2*a* corresponding to the bonding region M of the second substrate 2 is the state where the bonding films are formed only in the bonding region M.

In the bonding films in this state, a rounded portion q is generated at an edge. The rounded portion q is generated as follows: when, in a so-called partial deposition in which a bonding film is formed only in the portion of the bonding region M shown in FIGS. 2A and 2B, deposition is performed only at an opening using a metal mask or a silicon mask, a film thickness is reduced in the vicinity of the opening. As a result, the rounded portion q is generated as an inclination of the film thickness.

When the respective substrates in this state are arranged to face each other, a position gap, that is, a misalignment α is generated relative to a support portion 2*a*' and a second bonding film 10' as original bonding positions, and the position is shifted to the position of the support portion 2*a* and the second bonding film 10 indicated in FIG. 2A. When a load R is applied to the first substrate 1 and the second substrate 2 in this state as shown in FIG. 2B and the bonding of the first bonding film 7 to the second bonding film 10 is conducted, the bonding film (the second bonding film 10 in the drawing) is crushed at the rounded portion q of the bonding film edge, causing an inclination θ of the first substrate 1. The inclination θ impairs the uniformity of the gap G between the first optical film 3 and the second optical film 4 shown in FIGS. 1A to 1C. Accordingly, for suppressing the inclination of the substrate in bonding to maintain the uniformity of the gap G, it is desirable that the bonding film is formed up to the outside of the bonding region M. Further, it is more preferable also in the later-described manufacturing method that the bonding film is formed so as to substantially cover the substrate face like the first bonding film 7 and the second bonding film 10 shown in FIGS. 1B and 1C in the etalon filter 100 according to the embodiment.

To avoid damage to the first optical surface film 3*c* and the second optical surface film 4*c* due to, for example, an etchant in the case of wet type, an etching gas in the case of dry type, or the like used in peeling of the bonding film in this predetermined region, the surfaces of the first optical surface film 3*c* and the second optical surface film 4*c* can be protected by the first protective film 6 and the second protective film 9. Accordingly, $Al_2O_3$ or AlN, which is resistant to an etchant or an etching gas, is preferably used as the protective film. In the etalon filter 100 according to the embodiment described above, the surfaces of the first optical film 3 and the second optical film 4 are protected by the first protective film 6 and the second protective film 9, that is, the surfaces of the first optical surface film 3*c* and the second optical surface film 4*c* are protected against a reaction with components in the atmosphere to avoid deterioration of characteristics of the first optical film 3 and the second optical film 4. Moreover, the surfaces of the first optical surface film 3*c* and the second optical surface film 4*c* can be protected against an etching gas, an etchant, or the like used in removing the bonding films in the portions of the forming regions m and m' of the optical films, and therefore predetermined optical characteristics of the first optical film 3 and the second optical film 4 can be maintained.

The first protective film 6 and the second protective film 9 according to the embodiment described above are not formed in the bonding region M, but they may be formed between the bonding film and the substrate. The first protective film 6 and the second protective film 9 are not formed on the surfaces of the first external connection electrode 5*a* and the second external connection electrode 8*a* for maintaining electrical continuity.

The etalon filter 100 according to the embodiment described above can cause, for example, light incident from the external side of the first substrate 1 to be reflected and interfere in the gap G between the first optical film 3 and the second optical film 4 and to emit only light at a desired specific wavelength from the opposite side of the light-incident side. Further, the movable portion 1*a* included in the first substrate 1 electrostatically drives the diaphragm portion 1*b*, whereby the gap G can be changed. Accordingly, a configuration of a so-called tunable interference filter in which the wavelength of emitted light can be set by setting the variable gap G is the etalon filter 100 according to the embodiment. However, the invention can also be applied to a fixed-wavelength interference filter in which the movable portion 1*a*, the diaphragm portion 1*b*, the first actuator electrode 5, and the second actuator electrode 8 which make a wavelength tunable are not included.

Figure 3:
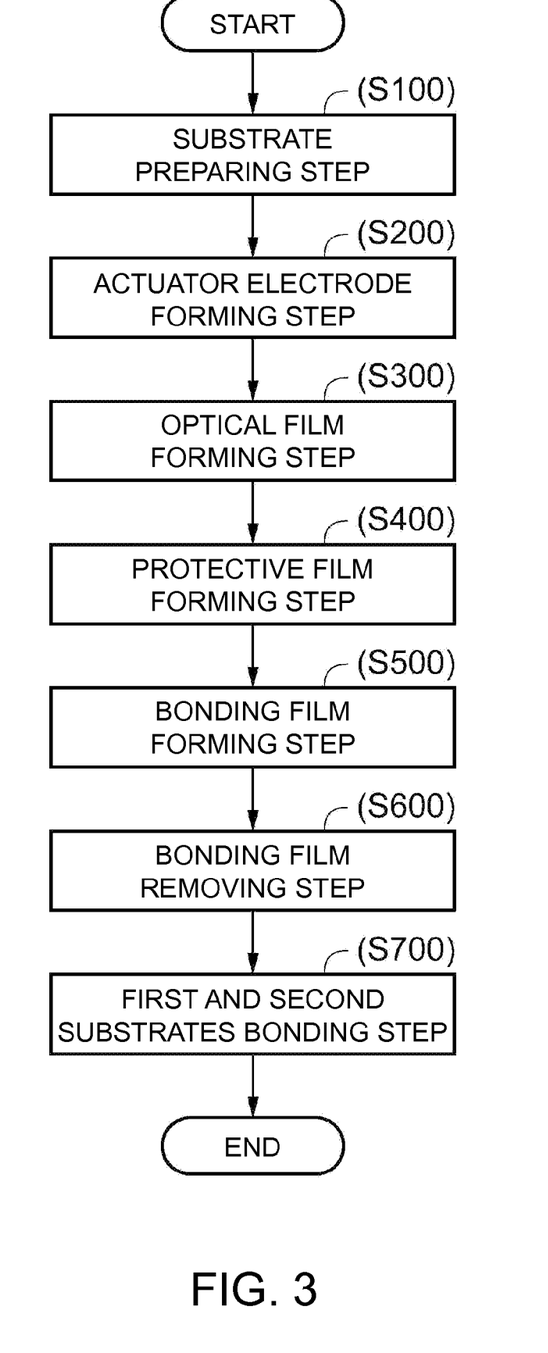
FIG. 3 is a flowchart according to a second embodiment, showing a method for manufacturing the optical filter according to the first embodiment.

Next, a method for manufacturing the etalon filter 100 according to the first embodiment will be schematically described. FIG. 3 is a flowchart showing manufacturing steps of the etalon filter 100 according to the first embodiment. FIGS. 4A to 4C, 5D to 5F, and 6G and 6H are schematic cross-sectional views showing a manufacturing method of the first substrate 1 and the second substrate 2 in each manufacturing step.

Figure 4A:
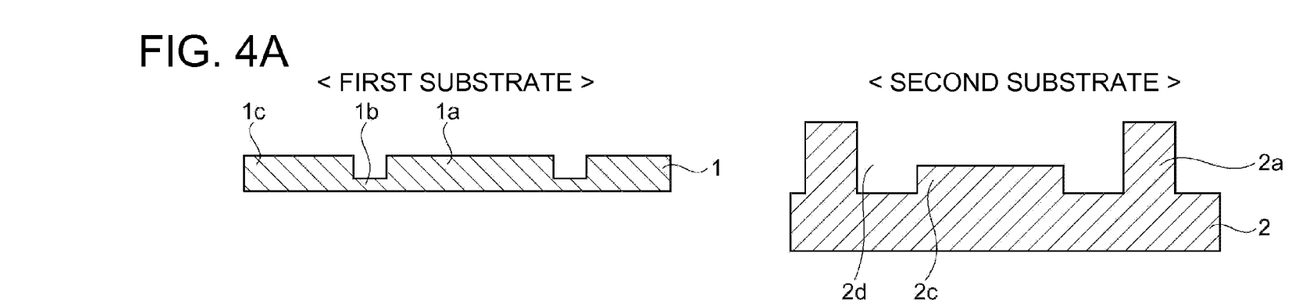
FIGS. 4A to 4C are cross-sectional views showing the manufacturing method according to the second embodiment.
Figure 4B:
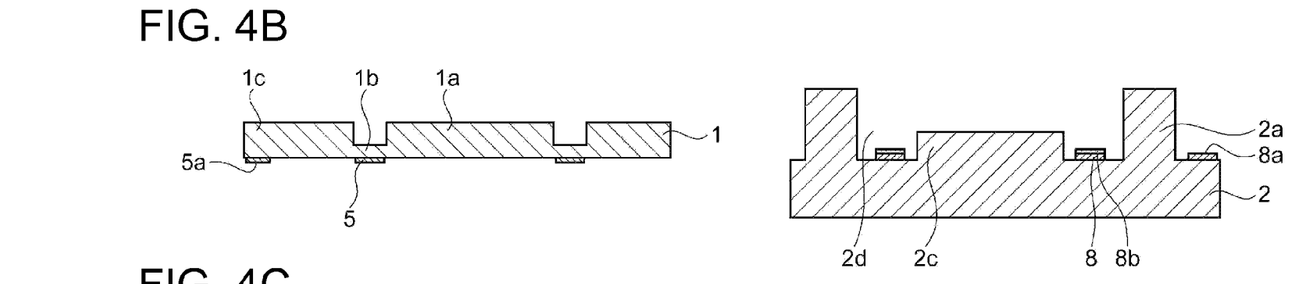

First, as a substrate preparing step (S100) as shown in FIG. 4A, the first substrate 1 where the movable portion 1*a*, the diaphragm portion 1b, and the holding portion 1c are previously fabricated and the second substrate 2 where the support portion 2a, the mirror forming portion 2c, and the recess 2d are previously fabricated are prepared. As described above, each of the first substrate 1 and the second substrate 2 can be obtained by performing, for a substrate of a transparent base material, such as silica glass for example, with a thickness of about 200 μm, the formation of predetermined portions through patterning and etching a known resist material. Further, in S100, cleaning, drying, and the like are performed as the preparation of subsequent steps, so that the first substrate 1 and the second substrate 2 are made clean. The method proceeds to an actuator electrode forming step (S200) in which the first actuator electrode 5 and the second actuator electrode 8 are formed on the prepared first and second substrates 1 and 2, respectively. In the actuator electrode forming step (S200) as shown in FIG. 4B, the first actuator electrode 5 in a doughnut shape on the side of the mirror forming face 1d corresponding to the diaphragm portion 1b in the first substrate 1, the first external connection electrode 5a, and not-shown wiring which connects the first actuator electrode 5 with the first external connection electrode 5a are formed. The first actuator electrode 5, the first external connection electrode 5a, and the not-shown wiring which connects the first actuator electrode 5 with the first external connection electrode 5a are formed as follows: an indium tin oxide (ITO) film is deposited on the substrate face on the electrode forming side to a thickness of 0.1 μm by a sputtering method; next, a resist material is patterned so as to cover the forming regions of the first actuator electrode 5, the first external connection electrode 5a, and the not-shown wiring which connects the first actuator electrode 5 with the first external connection electrode 5a; and the ITO film other than that for the first actuator electrode 5, the first external connection electrode 5a, and the not-shown wiring which connects the first actuator electrode 5 with the first external connection electrode 5a is removed by etching.

Also in the second substrate 2 similarly to the first substrate 1, the second actuator electrode 8 on the bottom face portion of the recess 2d, the second external connection electrode 8a, and not-shown wiring which connects the second actuator electrode 8 with the second external connection electrode 8a are formed of an ITO film. Next, a mask in which upper surfaces of the second actuator electrode 8 and the not-shown wiring which connects the second actuator electrode 8 with the second external connection electrode 8a are opened is formed by patterning a resist material, and a tetraethoxysilane (TEOS) film is deposited by a CVD method on the upper surfaces of the second actuator electrode 8 and the not-shown wiring which connects the second actuator electrode 8 with the second external connection electrode 8a to form the electrode protective film 8b as an insulating film. Also on the upper surfaces of the first actuator electrode 5 of the first substrate 1 and the not-shown wiring which connects the first actuator electrode 5 with the first external connection electrode 5a, a TEOS film may be formed similarly to the second substrate 2.

Figure 4C:
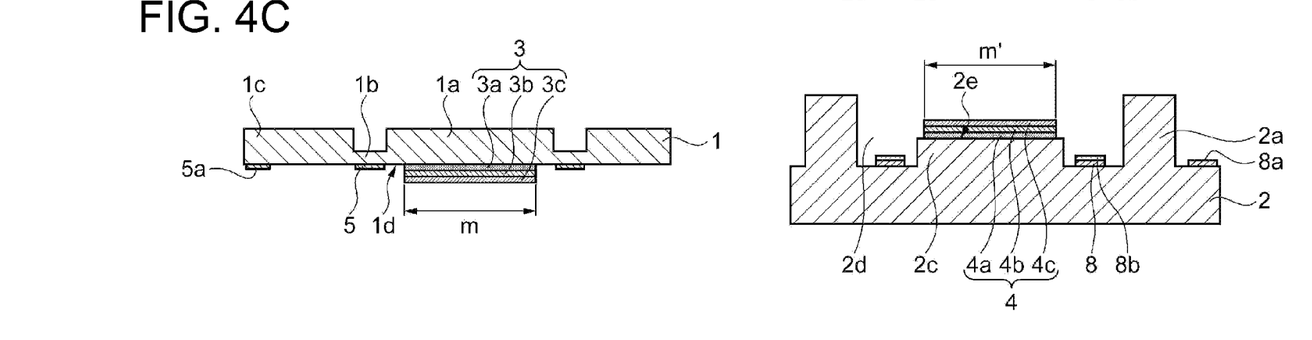

Next, the method proceeds to an optical film forming step (S300). In the optical film forming step (S300) as shown in FIG. 4C, the first optical film 3 is formed on the mirror forming face 1d of the first substrate 1, and the second optical film 4 is formed on the mirror forming face 2e of the second substrate 2. As described above, the first optical film 3 is formed by stacking the first optical substrate film 3a, the first optical intermediate film 3b, and the first optical surface film 3c, while the second optical film 4 is formed by stacking the second optical substrate film 4a, the second optical intermediate film 4b, and the second optical surface film 4c.

Since the first substrate 1 and the second substrate 2 are formed using silica glass as a base material, the first optical substrate film 3a and the second optical substrate film 4a are formed by depositing titanium oxide ($TiO_2$) or tantalum oxide ($Ta_2O_5$) having a refractive index higher than that of the first substrate 1 and the second substrate 2 to a thickness of about 30 nm. The first optical intermediate film 3b and the second optical intermediate film 4b are formed by depositing silicon oxide ($SiO_2$) having a refractive index lower than that of the first optical substrate film 3a and the second optical substrate film 4a to a thickness of 20 to 30 nm, for enhancing reflection efficiency of the first optical film 3 and the second optical film 4. Further, for the surface layers of the optical films, a metal as a mirror material, for example, Ag; AgC, AgCu, or AgSmCu as an Ag alloy; Al; or an Al alloy is preferably used as the first optical surface film 3c and the second optical surface film 4c, and the metal or metal alloy is deposited by a vapor deposition method or a sputtering method to a thickness of 50 nm. On surfaces of the coatings each formed as a multilayer in this manner, masks which cover the forming region m of the first optical film 3 and the forming region m' of the second optical film 4 are formed by patterning a resist material, and the coatings other than those for the first optical film 3 and the second optical film 4 are removed by an etching method to form the first optical film 3 and the second optical film 4.

In the optical film forming step (S300) described above, the coatings other than those for the first optical film 3 and the second optical film 4 are removed by patterning after stacking as a multilayer film, to form the first optical film 3 and the second optical film 4. However, the first optical film 3 and the second optical film 4 can be formed also as follows: the first optical substrate film 3a and the second optical substrate film 4a are deposited and patterned to leave the coatings in the forming regions m and m'; the first optical intermediate film 3b and the second optical intermediate film 4b are deposited and patterned to leave the coatings in the forming regions m and m'; and finally the first optical surface film 3c and the second optical surface film 4c are deposited and patterned to leave the coatings in the forming regions m and m'.

Figures 5D, 5E:
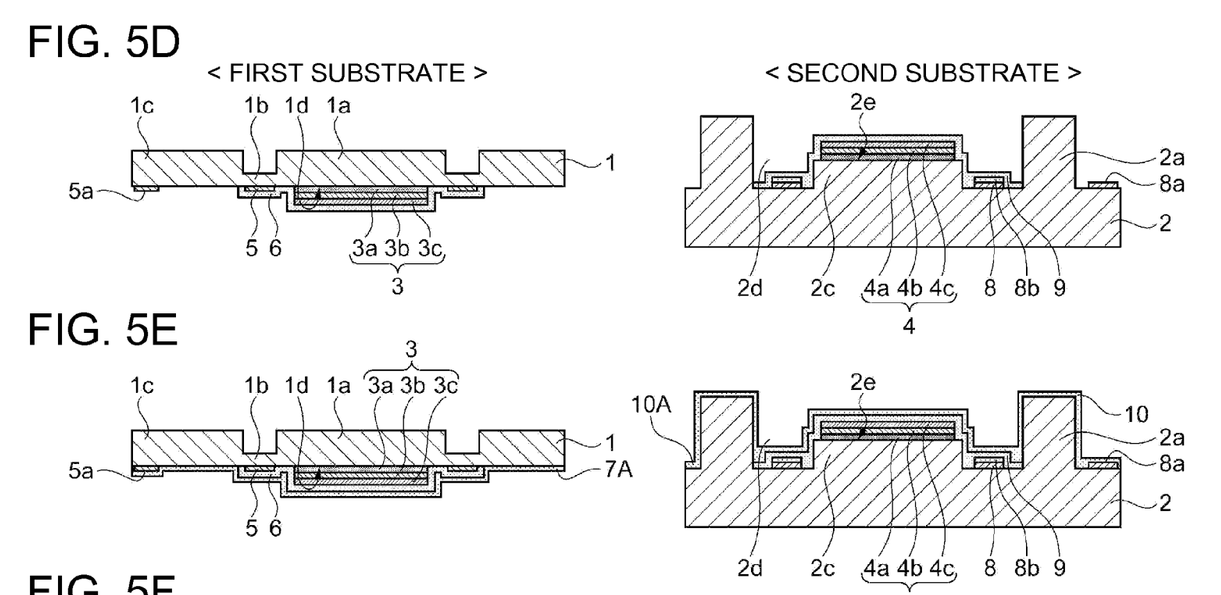
FIGS. 5D to 5F are cross-sectional views showing the manufacturing method according to the second embodiment.

Next, the method proceeds to a protective film forming step (S400). In the protective film forming step (S400) as shown in FIG. 5D, the first protective film 6 is formed for the first substrate 1 and the second protective film 9 is formed for the second substrate 2, so as to cover the first actuator electrode 5, the second actuator electrode 8, the first optical film 3, and the second optical film 4. For the first protective film 6 and the second protective film 9, aluminum oxide ($Al_2O_3$) or aluminum nitride (AlN) is preferably used. By forming the first protective film 6 and the second protective film 9 as described above, the surfaces of the first optical surface film 3c and the second optical surface film 4c can be protected against a reaction with components in the atmosphere, deterioration of characteristics of the first optical film 3 and the second optical film 4 can be avoided, the surfaces of the first optical surface film 3c and the second optical surface film 4c can be protected against an etchant or the like in removing the bonding films in the portions of the forming regions m and m' of the optical films, and therefore predetermined optical characteristics of the first optical film 3 and the second optical film 4 can be maintained. The first protective film 6 and the second protective film 9 are not formed on the surfaces of the first external connection electrode 5a and the second external connection electrode 8a, and the protective films may or may not be formed in the range of the bonding region M. However, for enhancing the fixing force and adhesion of the bonding films formed in the bonding region M described later, it is preferable that the first protective film 6 and the second protective film 9 are not formed within the range of the bonding region M.

After the protective film forming step (S400), the method proceeds to a bonding film forming step (S500). In the bonding film forming step (S500) as shown in FIG. 5E, a first bonding film 7A and a second bonding film 10A are deposited on the entire surfaces on the forming sides of the first optical film 3 and the second optical film 4 of the first substrate 1 and the second substrate 2, respectively. As the bonding film, a plasma-polymerized film is deposited by a plasma CVD method to a thickness of 50 nm. As the plasma-polymerized film, one containing a Si skeleton having a siloxane bond and a leaving group bonded to the Si skeleton is preferably used.

Figure 5F:
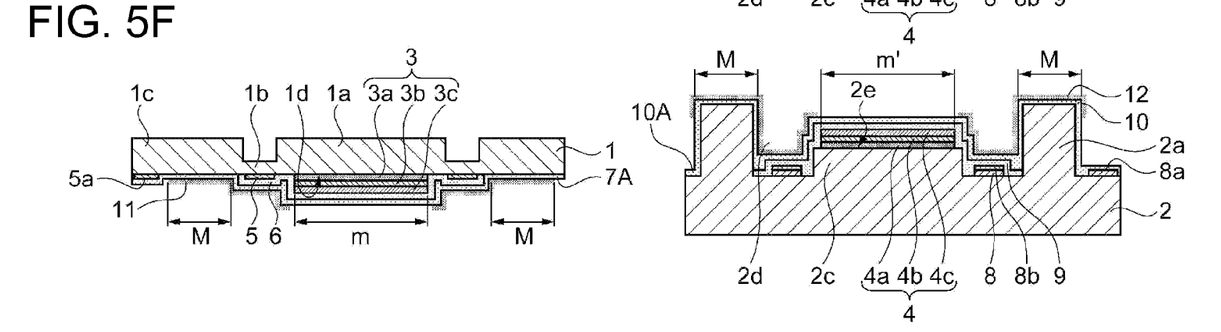

Next, the method proceeds to a bonding film removing step (S600). The bonding film removing step (S600) is a step of forming the first bonding film 7 and the second bonding film 10. First, as shown in FIG. 5F, a first mask 11 and a second mask 12 each formed of a metal mask or a silicon mask having openings as portions to be removed for making the first bonding film 7 and the second bonding film 10 are bonded on the first bonding film 7A and the second bonding film 10A, respectively, by performing alignment. As the portions to be removed from the first bonding film 7A and the second bonding film 10A, at least the portions at the forming regions m and m' of the first optical film 3 and the second optical film 4, the first external connection electrode 5a, and the second external connection electrode 8a should be removed.

Figure 6G:
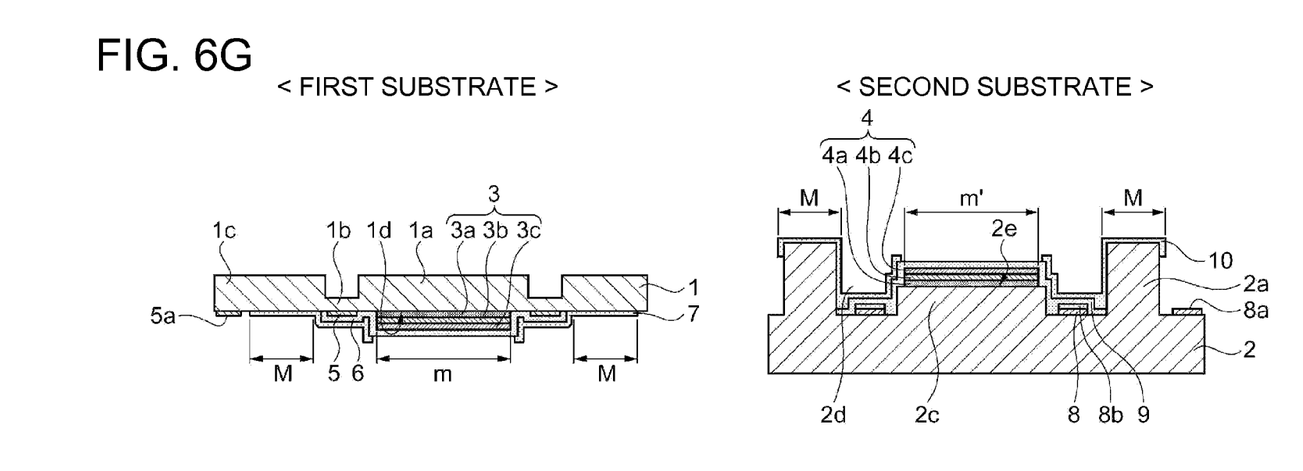
FIGS. 6G and 6H are cross-sectional views showing the manufacturing method according to the second embodiment.

From the first substrate 1 and the second substrate 2 on which the first mask 11 and the second mask 12 are bonded, respectively, the portions of the first bonding film 7A and the second bonding film 10A exposed through the mask openings are removed by dry etching using $CF_4$ gas, and the first mask 11 and the second mask 12 are removed, whereby the first substrate 1 and the second substrate 2 before bonding shown in FIG. 6G can be obtained. In the bonding film removing step (S600), $CF_4$ gas is used as an etching gas. However, even when the first bonding film 7A and the second bonding film 10A in the forming regions m and m' of the first optical film 3 and the second optical film 4 are removed, the first protective film 6 and the second protective film 9 formed of $Al_2O_3$ or AlN at the lower layers can block $CF_4$ gas from reaching the first optical surface film 3c and the second optical surface film 4c, whereby the damage to the first optical surface film 3c and the second optical surface film 4c can be prevented, making it possible to obtain predetermined optical quality.

Next, the method proceeds to a bonding step (S700). In the bonding step (S700), $O_2$ plasma treatment or UV irradiation treatment is first performed for activating the first bonding film 7 and the second bonding film 10. In the case of $O_2$ plasma treatment, it is preferable to perform the treatment for 30 sec under the conditions: flow rate, 30 cc/min; treatment pressure, 27 Pa; and RF power, 200 W. In the case of UV irradiation treatment, it is preferable to perform the treatment for 3 min using excimer UV irradiation (at a wavelength of 172 nm). In the activation treatment, when the energy for the activation treatment described above is applied to the first optical surface film 3c and the second optical surface film 4c as the uppermost surfaces of the first optical film 3 and the second optical film 4, damage (defect) is generated in the coatings. Therefore, it is preferable that the surfaces of the first optical surface film 3c and the second optical surface film 4c are protected by a not-shown metal mask or the like.

Figure 6H:
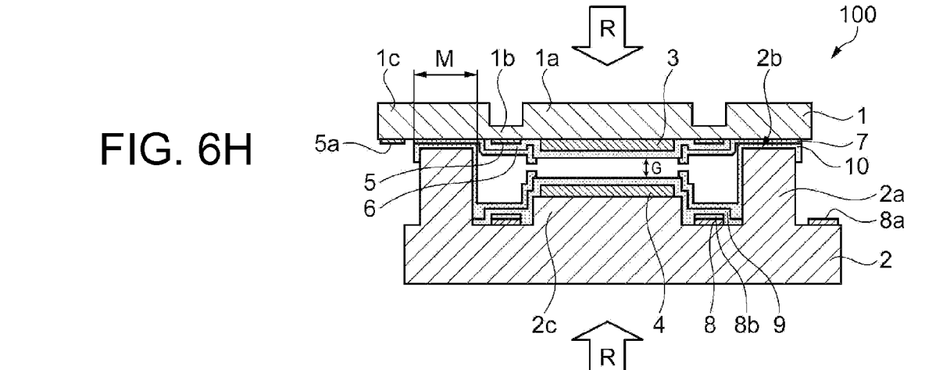

The first bonding film 7 and the second bonding film 10 which are activated in this manner are faced each other, the load R is applied as shown in FIG. 6H, and the bonding films are bonded together at the corresponding region of the support portion 2a of the second substrate 2, whereby the etalon filter 100 is obtained. At this time, alignment adjustment between the first substrate 1 and the second substrate 2 before bonding should be performed precisely so that the gap G between the first optical film 3 and the second optical film 4 shown in FIGS. 1B and 1C becomes uniform. In the etalon filter 100 according to the embodiment, the second bonding film 10 is formed beyond the region of the support face 2b in the support portion 2a, and also in the first substrate 1, the first bonding film 7 is formed beyond the region corresponding to the support face 2b. Therefore, uniformity of the gap G due to misalignment, in other words, parallelism between the first optical film 3 and the second optical film 4 can be easily maintained, making it possible to provide excellent filter characteristics.

Another Embodiment

Figure 7:
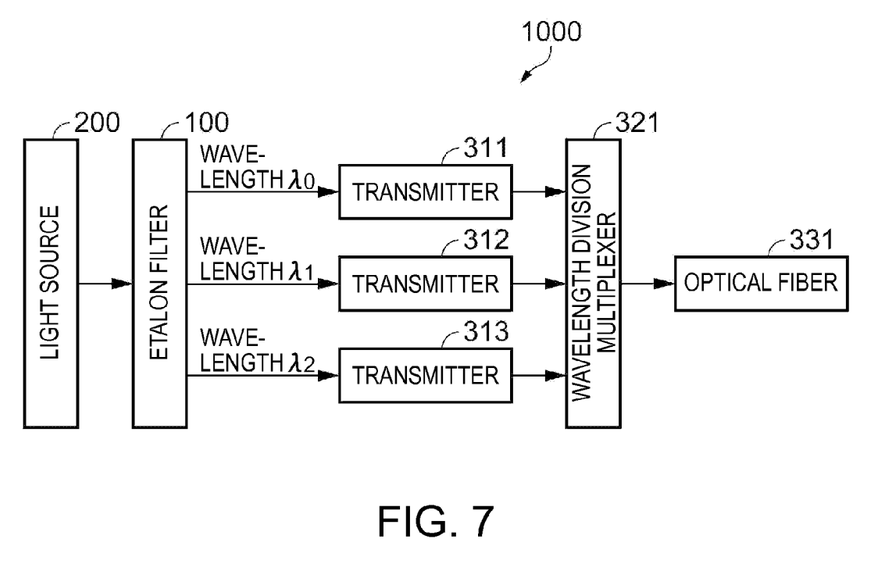
FIG. 7 is a block diagram showing one example of an optical device using the optical filter according to the first embodiment.

One example of an optical device using the etalon filter 100 described above will be described. FIG. 7 is a block diagram showing a schematic configuration of a transmitter of a wavelength division multiplexing (WDM) communications system as one example of the optical device. In WDM communications, by utilizing the characteristic that signals at different wavelengths do not interfere with each other, when a plurality of optical signals at different wavelengths are used in a multiplexing manner within one optical fiber, the transmission amount of data can be increased without adding more optical fiber lines.

In FIG. 7, a wavelength division multiplexing transmitter 1000 has the etalon filter 100 on which light from a light source 200 is incident. Through the etalon filter 100 (provided with an etalon filter adopting any of the mentioned above mirror structures), light at a plurality of wavelengths $\lambda 0$, $\lambda 1$, $\lambda 2$, . . . are transmitted. Transmitters 311, 312, and 313 are each disposed for every wavelength. Optical pulse signals corresponding to a plurality of channels from the transmitters 311, 312, and 313 are combined into one in a wavelength division multiplexer 321 to be sent to one optical fiber transmission line 331.

The invention can also be applied similarly to an optical code division multiplexing (OCDM) transmitter. This is because, OCDM distinguishes channels through pattern matching of coded optical pulse signals, and each optical pulse constituting an optical pulse signal contains a light component at a different wavelength. In this manner, by applying the invention to optical devices, highly reliable optical devices (for example, various kinds of sensors or application devices of optical communications) in which deterioration of characteristics of an optical film is suppressed are realized.

As described above, according to at least one of the embodiments of the invention, in an optical filter configured by bonding substrates for example, parallelism between optical films disposed on the substrates can be assured by suppressing an inclination of the substrate. The invention is suitable for applying to, for example, an interference type optical filter such as an etalon filter. However, the invention is not limited to this example and can be applied to all the structures (elements or devices) using an optical film having both light reflection characteristics and light transmission characteristics as a mirror structure.

The entire disclosure of Japanese Patent Application No. 2010-254592, Nov. 15, 2010 filed is expressly incorporated by reference herein.

What is claimed is:

1. An optical filter comprising:
   a first substrate;
   a second substrate having a support portion which supports the first substrate;
   a first optical film provided on the first substrate;
   a second optical film provided on the second substrate and arranged to face the first optical film;
   a first protective film covering at least the first optical film;
   a second protective film covering at least the second optical film;
   a first bonding film, a portion of the first bonding film overlapping a surface of the first protective film in a plan view but not overlapping the first optical film; and
   a second bonding film, a portion of the second bonding film overlapping a surface of the second protective film in the plan view but not overlapping the second optical film.

2. The optical filter according to claim 1, wherein each of the first bonding film and the second bonding film is a plasma-polymerized film containing a Si skeleton having a siloxane bond and a leaving group bonded to the Si skeleton.

3. The optical filter according to claim 1, wherein each of the first protective film and the second protective film is aluminum oxide or aluminum nitride.

4. The optical filter according to claim 1, wherein the first protective film is formed around the first optical film, and the second protective film is formed around the second optical film.

5. The optical filter according to claim 1 further comprising a first actuator electrode formed on the first substrate and a second actuator electrode formed on the second substrate,
   wherein the first protective film is formed on the first actuator electrode,
   the second protective film is formed on the second actuator electrode,
   the portion of the first bonding film overlaps the first actuator electrode, and
   the portion of the second bonding film overlaps the second actuator electrode.

6. An optical device comprising the optical filter according to claim 1.

7. A method for manufacturing an optical filter including
   a first substrate,
   a second substrate having a support portion which supports the first substrate,
   a first optical film provided on the first substrate,
   a second optical film provided on the second substrate and arranged to face the first optical film,
   a first bonding film disposed on a supported region face of the first substrate, the supported region face being arranged to face the support face of the second substrate,
   a second bonding film disposed on a support face of the support portion, the support face supporting the first substrate,
   wherein
   the first substrate and the second substrate are fixed to each other by bonding the first bonding film to the second bonding film at the support face and the supported region face, the method comprising:
   forming a first protective film covering at least a surface of the first optical film;
   forming a second protective film covering at least a surface of the second optical film;
   forming the first bonding film on a forming side of the first optical film of the first substrate so as to include at least the support face;
   forming the second bonding film on a forming side of the second optical film of the second substrate so as to include at least the supported region face;
   removing a portion of the first bonding film, the portion overlapping the first optical film in a plan view; and
   removing a portion of the second bonding film, the portion overlapping the second optical film in the plan view.

8. The method for manufacturing the optical filter according to claim 7, wherein
   each of the first and second protective films is aluminum oxide or aluminum nitride.

9. The method for manufacturing the optical filter according to claim 7, wherein
   the removing of the first bonding film and the second bonding film is performed by a dry etching method.

* * * * *